United States Patent [19]

Wu

[11] Patent Number: 5,282,898

[45] Date of Patent: * Feb. 1, 1994

[54] USE OF SURFACTANTS IN PROCESSING ABRASIVE PIGMENTS

[75] Inventor: Joseph H. Z. Wu, Somerset, N.J.

[73] Assignee: Engelhard Corporation, Iselin, N.J.

[*] Notice: The portion of the term of this patent subsequent to Aug. 3, 2010 has been disclaimed.

[21] Appl. No.: 898,116

[22] Filed: Jun. 12, 1992

[51] Int. Cl.$^5$ ............................................. C09C 1/36
[52] U.S. Cl. ..................................... 106/447; 106/487; 162/181.8
[58] Field of Search ............... 106/447, 487; 501/148; 162/181.5, 181.8

[56] References Cited

U.S. PATENT DOCUMENTS

| | | | |
|---|---|---|---|
| 3,014,836 | 12/1961 | Proctor | 162/181 |
| 3,058,671 | 10/1962 | Billue | 241/24 |
| 3,130,063 | 4/1964 | Millman et al. | 106/308 |
| 3,171,718 | 3/1965 | Gunn et al. | 23/110 |
| 3,343,973 | 9/1967 | Billue | 106/288 |
| 3,451,835 | 6/1969 | Ganter et al. | 106/447 |
| 3,582,378 | 6/1971 | Miller | 106/288 Q |
| 3,586,523 | 6/1971 | Fanselow et al. | 106/288 B |
| 3,846,147 | 11/1974 | Tapper | 106/288 B |
| 4,017,324 | 4/1977 | Eggers | 106/288 B |
| 4,381,948 | 5/1983 | McConnell et al. | 106/288 B |
| 4,830,673 | 5/1989 | Jones et al. | 106/487 |
| 5,006,574 | 4/1991 | Sennett et al. | 523/351 |
| 5,028,268 | 7/1991 | Ince et al. | 106/486 |
| 5,034,062 | 7/1991 | Lein et al. | 106/416 |
| 5,112,782 | 5/1992 | Brown et al. | 501/144 |

OTHER PUBLICATIONS

"Scale Inhibitors", Rohm & Haas, Polymer Additives for Aqueous Systems, Industrial Chemicals.

*Primary Examiner*—Karl Group
*Assistant Examiner*—Chris Gallo
*Attorney, Agent, or Firm*—I. L. Moselle

[57] ABSTRACT

The present invention provides a simple inexpensive means to decrease the abrasivity of abrasive pigments such as calcined kaolin and titania. In accordance with this invention, a trace of a nonionic and/or anionic surfactant is incorporated with abrasion pigment prior to or during the preparation of an aqueous pigment slurry or to dry pigment.

15 Claims, No Drawings

USE OF SURFACTANTS IN PROCESSING ABRASIVE PIGMENTS

BACKGROUND OF THE INVENTION

This invention relates to a simple means for reducing the abrasivity of abrasive pigments such as calcined clay and titanium oxide pigments used by the paper industry.

Calcined kaolin and titania pigments have been used for several decades in a number of industrial applications such as paper coating, paper filling, paints, plastics, etc. In those applications they impart to the finished products a number of desirable properties: brightness, opacity and hiding power. In the case of calcined kaolin pigments, paper coating and filling applications require almost exclusively ultrafine fully calcined kaolin pigments such as ANSILEX 93 ® pigment manufactured by Engelhard Corporation. See, for example, U.S. Pat. No. 3,586,523, Fanselow, et al., the teachings of which are incorporated herein by cross-reference.

These fully calcined pigments have an undesirable property, namely, they are relatively abrasive when compared to noncalcined (hydrous kaolin pigments) or, in some cases, partially calcined (metakaolin) pigments. For example, conventional so-called "low abrasion" calcined kaolin pigments typically have an Einlehner abrasion value of about 20 mg. An ultrafine calcined kaolin pigment which has recently been introduced to the paper industry has a lower abrasion but appears to have lower scatter properties than that of the somewhat coarser but more abrasive products such as ANSILEX 93 ® pigment. In practical terms, increased abrasivity translates into increased wear of bronze web forming screens (wires) on paper making machines, dulling of paper slitter knives, wear of printing plates when they come into contact with coated paper containing fine calcined pigments in the coating formulation, and, in general, wear of any surfaces coming into contact with these pigments. Titanium dioxide pigments are generally significantly more abrasive than fully calcined kaolin pigments.

Paper makers are becoming increasingly demanding in their need for lower abrasion. To overcome the problem, suitable kaolin can be calcined at temperatures less than those required to produce fully calcined pigments. In this instance, calcination temperature is controlled to produce the form of pigment known as metakaolin. It is known, however, that the brightness of a metakaolin pigment is always poorer, generally by about 2-3%, than that of fully calcined pigments derived from the same clay calciner feed. However, even metakaolin pigments may be more abrasive than paper makers may desire. Examples of patents disclosing calcination of kaolins to provide pigments include: U.S. Pat. No. 3,586,523, Fanselow, et al.; U.S. Pat. No. 3,014,836, Proctor; U.S. Pat. No. 3,058,671, Billue; U.S. Pat. No. 3,343,943, Billue; U.S. Pat. No. 3,171,718, Gunn, et al.; U.S. Pat. No. 4,381,948, McConnell, et al. and U.S. Pat. No. 5,112,782, Brown, et al. Many of these patents make reference to the desirability of reduced abrasivity but in all cases achieve such result by kaolin crude selection and/or processing conditions utilized in steps carried out prior to the final calcination of the original hydrous kaolin feed.

Originally kaolin pigments were supplied in dry form to the end users. The demand for pigments in aqueous slurry form developed with the availability of appropriate shipping and handling facilities. Since the cost of shipping water is an undesirable expense, it is desirable to provide pigment slurries as concentrated as is feasible, consistent with the necessity of formulating slurries that are sufficiently fluid to be pumped yet are resistant to settling. This posed no significant problem when formulating slurries of hydrous (uncalcined kaolins). Thus, using conventional anionic clay dispersants such as condensed phosphate salts and conventional clay handling equipment, 70% solids slurries of fine particle size coating grade hydrous kaolin were readily achieved.

With the advent of ultrafine calcined kaolin pigments such as ANSILEX ® pigment, there was a greater challenge to prepare higher solids slurries of the pigments. However, the achievable high solids were limited by the requirement to assure satisfactory rheology and resistance to settling. In fact, 50% solids slurries of such pigments were difficult to achieve. When solids content increases, both high shear viscosity and low shear viscosity tend to increase. A higher low shear viscosity (such as a high Brookfield) and a lower high shear viscosity (such as a lower Hercules) are desirable. The high shear viscosity could be an indicator of pumpability and the low shear viscosity could be an indicator of settling. The dispersants commonly used usually give a low Brookfield viscosity, which could be an indication of fast settling tendency. When the Hercules viscosity becomes too high (meaning small rpm number) the slurry is not pumpable.

U.S. Pat. No. 5,028,268, Ince, et al., summarizes prior art efforts to improve rheology of aqueous slurries of calcined kaolin. This patent teaches spray drying a slurry of calcined kaolin powder and forming an aqueous slurry from the spray dried powder. Slurries containing 58% and 60% solids are described. Among the references cited in this patent is U.S. Pat. No. 4,017,324, Eggers. In accordance with this patent hydrous kaolin was added along with calcined kaolin in a slurry which also included a suspending agent such as CMC along with a dispersant. This was a development subsequent to the proposal in U.S. Pat. No. 3,130,063 to Millman, et al. to add an organic polymer to a predispersed suspension of the coarse hydrous clay to prevent settling. In accordance with the teachings of Eggers, slurries of mixtures of calcined and hydrous clay having 50% to 75% solids were reported. The dispersant used in illustrative examples was a mixture of relatively large amounts of TAMOL 731 (sodium salt of polymeric carboxy acid) and TRITON X-100 (octylphenoxy polyethoxyethanol). Although the presence of appreciable hydrous clay would be expected to result in a pigment mixture having lower abrasion than that of the calcined kaolin constituent, this approach necessitates an undesirable dilution of calcined clay with a material that is not to calcined kaolin terms of paper sheet properties. Another approach to handling calcined clay pigments was to use sufficient alkalizer agent to provide a pH in excess of 8 to render the suspension free from settling (See U.S. Pat. No. 3,846,147, Tapper). Properties of suspensions having up to 57% solids are described in that patent. In illustrative examples large amounts (30#/ton) of NOPCOSANT L and K were used to produce 58% solids suspensions. (NOPCOSANT is the trademark for anionic polymeric dispersants, namely, sodium salt of condensed naphthalene sulfonic acid.)

U.S. Pat. No. 5,034,062, Lein, et al., discloses the use of acid-containing anionic emulsion copolymers as calcined clay slurry stabilizers. The patent mentions the steep rise in high shear viscosity at solids levels above 50%. This patent broadly discloses that anionic and nonionic surfactants can be included in the slurries when it is desirable to produce dispersed slurries.

Slurries of fine particle size calcined kaolin pigments containing about 50% solids have been commercially available for several years and require the use of organic polymers to prevent sedimentation. The "normal" procedure of making such slurries of calcined kaolin slurries is first to make an aqueous solution of a thickening agent, such as CMC (carboxymethyl cellulose), in water containing a microbiocide, then add a dispersant, such as C211 (sodium polyacrylate) and mix the slurries in a high shear mixer.

Other patents relating to the production of slurries of calcined kaolin clay or calcined pigments derived from kaolin clay are U.S. Pat. No. 3,582,378, Miller and U.S. Pat. No. 5,006,574, Sennett, et al., both assigned to the assignee of the subject patent application.

Thus, the kaolin industry has spent many years in developing calcined kaolin pigments having lower abrasion and has expended a significant effort in producing concentrated slurries of calcined kaolin pigments that are stable. Various materials identified as surfactants or dispersants have been proposed in the development of stable slurries. To the best of the inventor's knowledge, however, none of the efforts directed to reducing abrasion have utilized surfactant addition to previously calcined kaolin and none of the research and development efforts addressing slurry stability focused on abrasion. The problem of pigment abrasion is unrelated to the rheology problem. Nonetheless, an improvement in pigment abrasion that is adverse to the provision of a stable, nonsettling slurry would not be commercially viable.

The present invention arose from the inventor's theory that addition of certain surfactants in very small amounts would reduce the abrasion of abrasive pigments such as calcined kaolin by reducing the friction between the pigment and wires and cutting blades used in paper making. This novel approach to a solution to the abrasion problem is believed to be nonobvious from the prior art. By the present invention, lower abrasion is achieved without the need to add a low abrasion uncalcined kaolin and thereby reduce the optical performance which would occur in practice of the pigment dilution process described in U.S. Pat. No. 4,017,324 (supra).

SUMMARY OF THE INVENTION

The present invention provides a simple inexpensive means to decrease the abrasivity of abrasive pigments such as calcined kaolin and titania. In accordance with this invention, a trace of a nonionic and/or anionic surfactant is incorporated with the abrasive pigment prior to or during the preparation of an aqueous pigment slurry or a solution of the surfactant can be added to dry pigment. Surfactants used in practice of this invention are known pigment dispersants although when used in practice of the invention do not fully disperse pigments.

Surfactants useful in practice of this invention are not detrimental to slurry stability and end-use performance of paper products.

Abrasion values referred to herein are determined by the Einlehner test operated under conditions described in the patent application.

PREFERRED EMBODIMENTS

Surfactants used in practice of this invention include those of nonionic and anionic character, preferably a water-soluble surfactant.

Among nonionic surfactants are octylphenoxy polyethoxy ethanols, which include condensates of ethylene oxide with octyl phenol. This type of nonionic surfactants can be represented by the formula

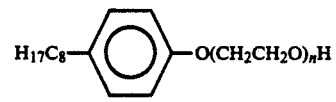

in which, n ranges from 5 to 15, preferably n from 9 to 10.

Specific surfactants of this type are supplied under the trademarks: Cono NIX-100, Igepal CA-630, Neutronyx 605, Triton X-100, Triton X-114, and Triton X-45.

Other recommended nonionic surfactants also include polyethyleneglycols mono(nonylphenyl)ether, e.g. nonylphenoxypoly (ethyleneoxy) ethanol compounds having the general formula

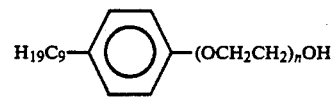

(n can be greater than 12, e.g. greater than 20.)

Specific surfactants of this type are supplied under the following trademarks: Conco NI, Dowfax 9N, Igepal CO, Makon, Neutronyx 600's, Nonipol NO, Polytergent B, Renex 600's, Solar NP, Sterox, Surfonic N, T-DET-N, Tergitol NP, and Triton N-42, Triton N-57, Triton N-60, Triton N-101 and Triton N-111.

Recommended surfactants also include: polyethylenepolypropylene glycols, which have the general formula:

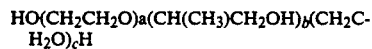

where b is at least 15 and $(CH_2CH_2O)_{a+c}$ is varied from 20 to 90% by weight.

Specific surfactants of this type are available under the trademarks: Poloxamer 188, Exocorpol, and Pluronic F68.

Recommended nonionic surfactants also include polyoxyethylene alcohols, which have the general formula:

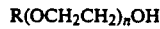

where R is a long chain alkyl group or mixer of alkyl groups. The compounds can be prepared by ethoxylation of fatty alcohols with ethylene oxide.

Specific surfactants of this type are: Alfonic 1012-40, Alfonic 1216-22, Alfonic 1216-30, Alfonic 1412-40, Alfonic 1412-60, Alfonic 610-50R, BioSoft EA, Brij, Dehydol, Emlphogene BC, Ethosperse, Emulgin C, Ethyoxyol, Lipal (CA, CSA, LA, MA, OA, TD), Lipocol, Macol, Polychol, Poly-Tergent J, Siponic (E, L, Y), Tergitol (L, S), Trycol, and Volpo.

Recommended nonionic surfactants also include polyethylene oxide fatty acid esters which have the general formula:

$$RCOO(CH_2CH_2O)_nH$$

or $$RCOO(CH_2CH_2O)_nOCR$$

where R is a long chain alkyl group or mixer of alkyl groups. The compounds can be prepared by esterification of fatty acid with ethylene oxide or with polyethylene glycol. It is preferable to have 12 to 15 or more ethylene oxide units.

Specific surfactants of this type are: Polyoxyl 40 sterarate, Emerest 2672, Lipal 39S, Mapeg S40, Myrj 52, Myrj 52S, and Pegosperse 1750-MS.

Recommended nonionic surfactants also include alkylaryl polyoxyethylene glycols. Specific surfactants of this type include: Triton X-114SB.

Recommended surfactants of this type also include alkylaryl polyether alcohol. Specific surfactants of this type include: Triton X-120 and Triton X-155.

Anionic surfactants are well known. Nonlimiting examples are lignin sulfonates and naphtahlene sulfonate formaldehyde complexes. It should be noted that sodium polyacrylate, a widely-used pigment dispersant, is not a surfactant. When added to water, it does not significantly reduce surface tension. At 0.1 wt % level, the surface tension of C211 solution reduces only 0.8%, while that of the Triton X-100 solution reduces 58%.

The amount of surfactant depends upon the absorption on the surface of the pigments, the reaction with other ingredients in the slurry, and the tendency of foaming in the case of nonionic surfactant. The total amount of surfactant may be from 0.002% to 1.0% (based on dry pigment), preferably from 0.02% to 0.5%, most preferably from 0.05% to 0.2%. When excess of surfactant is used, the abrasion reduction may not be as efficient and/or the surfactant may cause foaming. When an insufficient amount is employed, the abrasion may not be reduced significantly.

It is recommended to follow a suitable sequence of processing steps when it is also desirable to produce high solids slurries. Mixers with high shear blades, such as a Cowles system, are suitable for making down high solids calcined kaolin slurries. Although some other equipment may also have high work input into the clay, such as a pugger, it may not be as suitable as a Cowles mixer. The impurity of the water has a dramatic impact on the viscosity, as well as the stability of the slurry. For instance, in making down a 60 wt % solids slurry of calcined clay, when water contained as low as 3 ppm of Na+, the Brookfield viscosity decreased more than 80%, and the slurry became unstable. At the beginning of makedown, for example after the first half of the clay has been added, the solids content in the slurry is low, and the make down is easy, even though no surfactants or dispersants are in the slurry, It is preferable to add Triton X-100 or other suitable surfactant after about ½ of the clay has been added and before the slurry (with full amount of clay) is subjected to high shear work efficiency. In such a way there is less tendency of foaming and higher efficiency in utilizing Triton X-100. (Foaming may be generated if water with Triton X-100 is subjected to high shear work without clay in it.)

It is very important to have high shear rate. If too low a shear rate is used, the viscosity of the slurry may remain poor even large amount of shear work may be input to the slurry after a long period of low shearing.

Slurries of the invention may have pH values in the range of about 4 to 10, usually in the range of 5 to 8. In addition to pigment, water and surfactant, materials conventionally used in pigment slurry preparation may be present. Examples of such materials are biocides, colloidal thickening agents, CMC and dispersants. For example, up to about 0.2% by weight of an acrylate pigment dispersant may also be present.

Generally, pigments which are amenable to the treatment have abrasion values above 10 when tested by the Einlehner test described hereinafter.

Pigments which have been benefitted by addition of surfactant include fully calcined kaolin, preferably fine particle size fully calcined kaolin having an average size of about 0.6 to 0.8 microns, metakaolin pigments and titanium dioxide. These may be used alone or in admixture with each other. Other abrasive pigments which may be improved include, by way of example, bentonite, ground carbonate minerals such as calcite or other forms of calcium carbonate and spinels.

The surfactant can be mixed with the abrasion pigment during slurry makedown producing slurries containing, for example, from 10% to about 60% solids. Alternatively, a solution of the surfactant can be added to dry pigment, with drying optional.

It is believed that surfactants used in the invention influence the surfaces and/or interactions between surfaces of the kaolin particles, and between surfaces of the particles and other surfaces which are in contact with them (such as blades of mixers, machine parts in contact with them, etc.). When a slurry system is crowded (the clay particles frequently in contact with each other and with other machinery surfaces), similar effects should be exhibited.

The following examples are given for illustrative purposes only.

Surfactants used in these examples are:

| | |
|---|---|
| PETRONATE HL ® | Sodium didodecylbenzene sulfonate (Sodium Petroleum Sulfonate), supplied by Witco Chemical Corporation - 62% active. |
| TRITON ® X-100 | Octylphenoxy polyethoxy ethanol (A alkylphenol-hydroxyethylene), supplied by Union Carbide Corporation - 97% active |
| TYZOR ® DEA | Alkynolamine complex (chelate) of titanium (organic titanate), nonionic type (although the titanate is hydrolyzed in the reaction with clay), supplied by DuPont Company 40–45% active This type of material becomes anionic as a result of hydrolysis |

EXAMPLE 1

In this example, nonionic and anionic surfactants were used to lower the Einlehner abrasion of a previously prepared slurry of fully calcined kaolin.

The slurry was a commercial 50 wt % slurry of Ansilex ®93. This slurry had a pH of 7 and had been prepared by mixing in a three-stage Cowles mixer. The slurry had been prepared by adding dry Ansilex-93 powder and water with thickener (CMC) and dispersant C211 (sodium polyacrylate), added continuously in the first stage. The second stage sheared with high speed (approx. 1000 rpm). The third stage played a role partially as a high shearing tank and partially as a trimming-down tank.

1(a) —Anionic Surfactant (Sodium dedodecylbenzene sulfonate)

Petronate HL sulfonate (61-63%) was added into different portions of a sample of the 50% solids Ansilex ®93 slurry at levels from 0.02% to 0.20 wt %, based on dry clay, while the slurry samples were stirred mildly with an air-driven paddle mixer at relatively low speed. After three minutes stirring, the treatment was completed.

For each level of treatment, Einlehner abrasion testing was performed once or twice. The Einlehner of the control (no treatment) was repeated 4 times because the data of the control sample is the most important reference. The Einlehner results of different levels of Petronate surfactant are a check of each other, but this advantage is not available in control data (only one level: zero). Furthermore, such data provide a base if a statistical analysis is desired. For instance, one can classify all Petronate surfactant treated samples as one group having a degree of freedom df=4, while the control group has df=3. Thus, such experimental design is believed to provide a high efficiency in using raw data.

Results of Einlehner abrasion testing are shown in Table 1.

1(b)—Nonionic surfactant (Octylphenoxy polyethoxy ethanol)

Triton X-100 surfactant was added to other portions of a sample of the 50 wt % plant Ansilex ®93 slurry samples at different levels from 0.05 wt % to 0.20 wt %, based on dry clay, while the slurry samples were stirred mildly by a mixer. After three minutes stirring, the treatment was completed.

Results of Einlehner abrasion testing using Triton X-100 surfactant are also shown in Table 1.

TABLE 1

EFFECT OF SURFACTANT ON EINLEHNER ABRASION OF ANSILEX ® 93 PIGMENT

| Controls | wt % Petronate HL | | | | wt % Triton X-100 | | |
|---|---|---|---|---|---|---|---|
| | 0.02 | .075 | 0.10 | 0.20 | 0.05 | 0.10 | 0.20 |
| Einlehner Abrasion, mg | | | | | | | |
| 20,21,20 21 | 13 | 8 | 13,13 | 11 | 17 | 18 | 14 |

Data in Table 1 show that Petronate HL was effective at all levels of use and that Triton X-100 was most effective when added in amount of 0.20% of the weight of the calcined kaolin pigment.

EXAMPLE 2

This example illustrates practice of the invention by incorporating surfactant during the preparation of a nominally 60% solids slurry of fully calcined kaolin pigment.

In a control test (no surfactant) dry, fully calcined kaolin (ANSILEX ®93) pigment was added gradually into water in a beaker while the system was mixed. The ion content of the water was as follows: Ca+ <0.01 ppm; Na+ <0.01 ppm; total NaCl equivalent <2 ppm; pH 6.5. A 62 wt % slurry was made when all dry pigment was added in. Dry clay was added in increments, while a Cowles mixer was in low shearing speed (1 inch diameter blade at 2800 rpm). Clay was added over a period of 25 minutes. Thereafter, high speed shearing at 12,000 rpm was applied for 10 minutes. The slurry was then diluted with water of the purity described above to 60 wt %. The pH of the slurry was 5.5.

The procedure was repeated except that three different surfactants were added to the water into which the Ansilex 93 pigment was added in the preparation of the 60% solids slurries. Surfactants were added to the water into which the calcined kaolin powder was added.

Based on this and other experimental work using various amounts of these surfactants, it was concluded that most suitable amounts of surfactants are: Petronate from 0.02% to 0.3% by weight of the calcined clay; Triton X-100 from 0.02% to 0.3% by weight and; Tyzor DEA from 0.02% to 0.1% by weight. Above the maximum level specified, a further reduction in abrasion would not be detected. Below the minimum specified level, the reduction in abrasion would be minimal.

EXAMPLE 3

The previous example disclosed a process of surfactant treatment for lowering Einlehner abrasion by adding surfactant into the previously made calcined kaolin slurry products. An alternative process is to add surfactant while the slurry is made down from dry clay. This is described in Example 3.

The slurry was prepared in the laboratory using a Dispersator (model No.89, Premier Mill Corp.) with a 1″ blade. Triton X-100 at 0.1 wt % level (based on dry clay) was added as a surfactant into 577 grams of water, containing Na+ <0.02 ppm, Ca++ <0.02 ppm. Six hundred twenty-five grams of fully calcined kaolin (Ansilex-93) powder was added gradually into the beaker while the system was mixed at 2,800 rpm. A solids content of 52 wt % was reached when all dry pigment was added in. The speed of the dispersator was increased to 8000 rpm, and continued for 2 minutes. The slurry was finally diluted to 50 wt % solids. The Einlehner abrasion loss for the slurry was 11 mg.

To compare the abrasion loss with that of the "standard composition" of a commercial 50 wt % solids calcined slurry, a slurry was made following the "standard" procedure and composition, using the same Dispersator with the 1″ blade. The "standard" slurry contained 0.15% C211, 0.05% CMC thickener and 0.09% microbicide AMA415 (Active ingredients: 1.15% 5-chloro-2-methyl-4-isothiazolin-3-one and 0.35% 2-methyl-4-isothiazolin-3-one) from Vining Industries, but no Triton X-100. All chemicals, except clay, were added into 577 grams of water (Na+ <0.02 ppm, Ca++ <0.01 ppm) first. Six hundred twenty-five grams of dry Ansilex-93 of the same batch (as used in the above slurry preparation) was added in water, under 2800 rpm agitation. A 52 wt % solids was reached when all dry pigment was added in. The speed of the dispersator was increased to 8000 rpm, and continued for 2 minutes. The slurry was then diluted to 50 wt % and submitted for Einlehner test. The average abrasion loss was 19 mg., significantly higher than that of the slurry formulated with Triton X-100 surfactant.

EXAMPLE 4

A 60 wt % solids calcined kaolin slurry was prepared with 0.2 wt % Triton X-100 and used for paper coating tests.

The slurry was prepared in the laboratory using the same Dispersator with the 1" blade. Microbicide AMA415 at 0.09 wt % level, based on dry clay, was added to 581 grams of water. Then, Triton X-100 at the 0.1 wt % level was added as a surfactant to reduce abrasion and also to help the slurry makedown. Nine hundred forty-nine grams of fully calcined kaolin (Ansilex-93) powder was added gradually into the beaker while the system was mixed at 2800 rpm. A 62 wt % solids was reached when all dry pigment was added in. The speed of the dispersator was increased to 12,000 rpm, and continued for 10 minutes. The slurry was then diluted to 60 wt % for property test. The Einlehner abrasion was reduced (from 18-22 mg. to 11 mg.) and the paper coating performance was equivalent to a normal calcined product.

EXAMPLE 5

This example illustrates the invention as applied to a titanium dioxide pigment. (Ti-Pure R-101 from E.I. DuPont). Ti-Pure R-101 is a high purity rutile titanium dioxide. Its average particle size is about 0.2 microns. Triton X-100 (1.2 grams) was added into a beaker containing 416.7 grams of water (Na+ <0.02 ppm, Ca++ <0.01 ppm). Six hundred twenty-five grams of Ti-Pure was added into the beaker while the Dispersator mixer with the 1" blade was used to stir the system at 2800 rpm. When all titania was added in and uniformly mixed, the slurry was tested by the Einlehner procedure. The control sample was made in the same way as described above, except that no surfactant was added. The average Einlehner abrasion loss of the untreated slurry (control) was 31 mg., while that of the Triton X-100 treated samples was 12.3 mg. Thus, the surfactant significantly reduced the abrasivity of the titania pigment.

EXAMPLE 6

This example illustrates practice of the invention using a commercial metakaolin pigment.

A metakaolin pigment commercially available under the trademark Spectrafil LA was used in this study. Slurries of 30 wt % solids were made in laboratory either with or without Triton X-100. For each batch, 625 grams of dry Spectrafil LA pigment and 1458 grams of water containing Na+ <0.02 ppm and Ca++ <0.01 ppm were used. The slurries were made in the Dispersator mixer with the 1" blade.

The average Einlehner abrasion of the Triton X-100 treated slurry was reduced to 6.25 mg. as compared to 8 mg of the untreated sample.

Metakaolin slurries were also prepared the same was as above, except 0.3 wt % TSPP was added to both the Triton treated and untreated samples. The average Einlehner loss of the Triton X-100 treated sample was reduced to 9.33 mg. from 12.25 mg. (control). This indicates that conventional clay dispersants may be present with surfactant while still achieving the benefit of the presence of surfactant.

EXAMPLE 7

This Example illustrates practice of this invention by applying a solution of surfactant to dry pigment without forming a pigment slurry.

Dry calcined kaolin powder, Ansilex-93, was used for this study. A Kitchen Aid Mixer, model K5SS, from Kitchen Aid, Inc. was used to blend the clay with surfactant solution. A 6.7% Triton X-100 solution was made by adding Triton X-100 into water containing Na+ <0.02 ppm and Ca++ <0.01 ppm, with hand stirring. The surfactant solution was sprayed on 175 grams of dry clay by a plastic spray bottle, while the clay was blended in the mixer. In 5 minutes, 5.2 grams of the solution of Triton surfactant was applied. Four batches, 175 grams each, were treated the same way and then all four were mixed together and blended in a mixer for 30 more minutes.

The treated samples exhibited an average Einlehner abrasion loss of 12.3 mg., while that of the untreated samples was 16 mg.

In the Einlehner Abrasion test, the weight loss of a wire disc contacted by a rotary abrader and test material is used as a relative measure of the abrasiveness of the test material. Details of the procedures and equipment used to obtain values reported in this application are as follows:

MATERIALS AND APPARATUS

1. Einlehner AT1000
2. Phosphor Bronze P.M. Wire Discs
3. Ultrasonic Bath
4. Vacuum desiccator
5. Tallboy Mixer
6. Usual laboratory equipment such as: balance (analytical and top loading), glassware, pH meter, oven
7. Reagents
   a. 5% by weight Sodium Pyrophosphate Solution (TSPP)
   b. Deionized Water
   c. Isopropyl Alcohol
   d. 1:1 NaOH

SAMPLE PREPARATION

1. Weigh 150 grams of sample to be tested. Measure 850 ml of deionized water and pour 75% into a 1 liter stainless steel beaker and add the weighed out 150 grams of sample. Save the remaining amount of deionized water to flush the slurry when it is later poured into the test cylinder.
2. Adjust pH of slurry to 7.0 using 5% TSPP solution or 1:1 solution of HCL.
3. Mix slurry 10 minutes on Tallboy mixer.

SAMPLE EVALUATION

1. Prepare test screens by placing several screens into a 250 beaker of micro detergent and deionized water. Place beaker into a ultrasonic bath for 5 minutes.
2. After treatment remove screen and wash thoroughly with deionized water. Dry screen with isopropyl alcohol. Then dry in oven at 105° C. for 15 minutes. Place screen into desiccator until needed.
3. Weigh treated test screen and place, with the marked side (blue side) facing the floor plate of the test cylinder, and assemble unit.
4. Place the rotary abrader on the tip of the rotating shaft. Make sure abrader is in the proper starting position (position 1-5).

5. Pour slurry into test cylinder and use the deionized water that was previously saved to flush any slurry that may remain in the stainless steel beaker.

6. Choose the appropriate instrument setting (Table I). Lower agitator shaft and put toggle switch to the on position to begin test.

7. Test is completed when the prescribed rotations are completed. The instrument will automatically shut off.

8. Raise the agitator shaft, remove the cylinder and remove test screen.

9. Wash test screen with deionized water and place in micro solution. Place in sonic bath for 5 minutes. Rinse with isopropyl alcohol.

10. Dry screen in oven at 105° C. for 15 minutes. Place screen into desiccator to cool.

11. Weigh screen to nearest 0.1 mg.

12. Report results according to calculation.

Calculation:

$$\frac{100,000}{\text{No of revolutions}} \times \text{mg. wt. loss} = \text{abrasion (mg/100,000 rev.)}$$

| SETTINGS AND NUMBER OF ROTATIONS | | | | | |
|---|---|---|---|---|---|
| Settings | 1 | 2 | 3 | 4 | 5 |
| Number of Rotations × $10^3$ | 7.25 | 21.75 | 43.5 | 87 | 174 |

Note:
A cycle time should be chosen to give a weight loss of at least 10 mg. but not over 40 mg.
Hydrous Kaolins are run using setting 5
Calcined Kaolins are run using setting 3

TEST PRECISION

The precision of the Einlehner method is based on data generated from four of assignee's facilities. The sample run at all facilities was ANSILEX®93-SM/50% solids slurry. Setting 3 was used in all testing. The data are as follows:

| | Laboratory | | | |
|---|---|---|---|---|
| | #1 | #2 | #3 | #4 |
| Av. | 17.5 | 16.7 | 16.3 | 16.6 |
| 95% Confi. | 3.1 | 3.1 | 2.8 | 3.4 |

I claim:

1. An improved pigment composition consisting essentially of particles of an abrasive pigment uniformly mixed with a a water-soluble arylalkyl sulfonate surfactant, said surfactant being present in an amount effective to reduce the Einlehner abrasion of said abrasive pigment.

2. The pigment of claim 1 wherein abrasive pigment is selected from the group consisting of metakaolin, fully calcined kaolin and titania and mixtures thereof.

3. The pigment of claim 1 wherein said surfactant is present in amount in the range of from 0.02% to 0.5% by weight of said pigment.

4. The pigment of claim 1 wherein said anionic surfactant is present in amount of from 0.02% to 0.2% by weight of said pigment.

5. The pigment of claim 1 which is in the form of an aqueous slurry.

6. An improved pigment consisting essentially of particles of fine particle size fully calcined kaolin clay mixed with from 0.02% to 0.4% by weight of a water-soluble nonionic surfactant, said amount of surfactant being effective to reduce the Einlehner abrasion of said particles of calcined kaolin clay.

7. The pigment of claim 6 wherein said surfactant is isooctylphenoxy polyethoxyethanol containing about 10 moles of ethylene oxide.

8. The pigment of claim 6 which is in the form of an aqueous slurry having a clay solids content above 15% by weight.

9. The slurry of claim 6 which has a clay solids content about 45% by weight.

10. The slurry of claim 7 which contains 0.1% to 0.2% of said surfactant based on the weight of said calcined kaolin.

11. The slurry of claim 10 wherein said surfactant is isooctylphenoxy polyethoxyethanol containing about 10 moles of ethylene oxide.

12. The slurry of claim 6 wherein the average particle size of said calcined kaolin is in the range of 0.6 to 0.8 microns.

13. The slurry of claim 6 which contains less than 0.5% by weight of an organic colloidal thickening agent.

14. A slurry consisting essentially of water and particles of fully calcined clay pigment having an average size in the range of 0.6 to 0.8 microns, said slurry having a pH in the range of 5 to 8 and containing from 0.02% to 0.2% based on the weight of said pigment of a nonionic polyoxyethylene ether surfactant, said amount of said surfactant being effective to reduce the Einlehner abrasion of said pigment.

15. The slurry of claim 14 wherein said surfactant is isooctylphenoxy polyethanol containing 10 moles of ethylene oxide and said slurry is free from an organic colloidal thickening agent and free from hydrous kaolin clay.

* * * * *